United States Patent
Kawaguchi et al.

(10) Patent No.: US 7,161,463 B2
(45) Date of Patent: Jan. 9, 2007

(54) ORGANIC NTC COMPOSITION, ORGANIC NTC DEVICE AND PRODUCTION METHOD OF THE SAME

(75) Inventors: Toshiyuki Kawaguchi, Tokyo (JP); Masayuki Takahashi, Nishitokyo (JP)

(73) Assignee: Shin-Etsu Polymer Co., Ltd., Tokyo (JP)

( * ) Notice: Subject to any disclaimer, the term of this patent is extended or adjusted under 35 U.S.C. 154(b) by 0 days.

(21) Appl. No.: 10/498,844

(22) PCT Filed: Dec. 13, 2002

(86) PCT No.: PCT/JP02/13089

§ 371 (c)(1),
(2), (4) Date: Jun. 14, 2004

(87) PCT Pub. No.: WO03/052777

PCT Pub. Date: Jun. 26, 2003

(65) Prior Publication Data

US 2005/0106409 A1    May 19, 2005

(30) Foreign Application Priority Data

Dec. 14, 2001 (JP) ............................. 2001-381849

(51) Int. Cl.
*H01C 1/012* (2006.01)

(52) U.S. Cl. ........................ 338/314; 338/25; 338/328; 338/329; 338/308

(58) Field of Classification Search ................ 338/314, 338/25, 328, 329, 308
See application file for complete search history.

(56) References Cited

FOREIGN PATENT DOCUMENTS

| EP | 0 121 289 A1 | 10/1984 |
|----|--------------|---------|
| JP | 59-43502 A1 | 3/1984 |
| JP | 59-135704 A1 | 8/1984 |
| JP | 03-012901 A1 | 1/1991 |
| JP | 3-211702 A1 | 9/1991 |
| JP | 03-255923 A1 | 11/1991 |
| JP | 05-267008 A1 | 10/1993 |
| JP | 06-045105 A1 | 2/1994 |
| JP | 61-145808 A1 | 7/2004 |

*Primary Examiner*—Robert D. Harlan
(74) *Attorney, Agent, or Firm*—Darby & Darby

(57) ABSTRACT

The organic NTC composition according to the present invention is a mixture of a conjugated organic semiconductor polymer and a thermoplastic resin or thermosetting resin. For example, the mixed amount of the thermoplastic resin or thermosetting resin is preferably equal to or lower than two times the amount of the conjugated organic semiconductor polymer, and a conjugated organic semiconductor polymer selected from solvent-soluble polyaniline, polythiophene, polypyrrole and their derivatives is preferably used.

This organic NTC composition makes it possible to provide an organic NTC device without using any expensive material and facilitates easy production at low temperatures.

10 Claims, 1 Drawing Sheet

ORGANIC NTC COMPOSITION, ORGANIC NTC DEVICE AND PRODUCTION METHOD OF THE SAME

CROSS-REFERENCE TO PRIOR APPLICATION

This is a U.S. national phase application under 35 U.S.C. §371 of International Patent Application No. PCT/JP02/13089 filed Dec. 13, 2002, and claims the benefit of Japanese Patent Application No. 2001-381849 filed Dec. 14, 2001 which is incorporated by reference herein. The International Application was published in Japanese on Jun. 26, 2003 as WO 03/05277 A1 under PCT Article 21(2).

TECHNICAL FIELD

The present invention relates to an organic NTC composition, an organic NTC device and a production method thereof. Detailedly, the invention relates to an organic NTC device used for temperature detection of batteries for cellular phones, mobile communication devices, personal computers and to be used ICs, transistors, crystal oscillators, liquid crystal displays and the like in electronic devices, as well as its production method.

BACKGROUND ART

Generally, NTC devices are used for temperature detection of batteries for cellular phones, mobile communication devices, personal computers or for ICs, transistors, crystal oscillators, liquid crystal displays and the like in for electronic devices. An NTC device has a Negative Temperature Coefficient, i.e., presenting decreasing resistance with increasing temperature. Since they are devices which change reversibly, they are used for the purpose of temperature compensation for correcting electric characteristics which are affected by temperature or for the purpose of limiting the surge current of switching power supplies when they are activated.

Conventional NTC compositions are produced by preparing a heat-sensitive composite oxide powder, consisting of expensive rare earth transition elements such as yttrium, lanthanum etc., cobalt and the like, adding an organic binder and other ceramics materials to the powder, blending them again and shaping the mixture into a desired form and sintering it at a high temperature of about 1400 deg. C. for about 2 hours. Then the NTC composition made up of semiconductor ceramics is applied with electrode paste mainly consisting of silver and baked. Further, glass paste is applied to any necessary part and baked to complete an NTC device.

The above-described NTC device employs expensive rare earth transition elements and high temperature baking processes, demanding high cost and resulting in failure to achieve high production yield. Further, the process has lower flexibility, and there are cases where it is not easy for the user to assemble an NTC device into circuit.

In consideration of the problems with the conventional technology, the present invention has been devised to solve the problems, and is to provide an organic NTC composition which does not need expensive material and which can be manufactured at low temperatures, and provide an organic NTC device as well as a production method thereof, which can be easily built into a circuit, achieving high productivity and high working flexibility.

DISCLOSURE OF INVENTION

The present inventors hereof have eagerly studied the above conventional technology and others, and at last found that a mixture of a conjugated organic semiconductor polymer, in particular, polyaniline, polythiophene, polypyrrole or their derivative polymer, with a thermoplastic resin or thermosetting resin in a predetermined ratio, presents sufficient enough an NTC function as the ceramic NTC devices using rare earth transition elements and provides markedly high productivity and process flexibility, and thus have completed the present invention.

Specifically, the organic NTC composition, organic NTC device and its production method according to the present invention are characterized by the following configuration or means, to provide the solution to the above problems.

(1) An organic NTC composition comprising: a mixture of a conjugated organic semiconductor polymer and a thermoplastic resin or thermosetting resin.

(2) The organic NTC composition defined in (1), wherein the mixed amount of the thermoplastic resin or thermosetting resin is equal to or lower than two times the amount of the conjugated organic semiconductor polymer.

(3) The organic NTC composition defined in (1), wherein the conjugated organic semiconductor polymer is one selected from polyaniline, polythiophene, polypyrrole and their derivative polymers.

(4) The organic NTC composition defined in (3), wherein the conjugated organic semiconductor polymer is solvent-soluble.

(5) An organic NTC device comprising:
the organic NTC composition defined in any one of (1) to (4), provided between a pair of electrodes.

(6) The organic NTC device defined in (5), wherein the electrodes are of metal foil and their surface in contact with the organic NTC composition is roughened.

(7) A method of producing the organic NTC device defined in (5), comprising the steps of:
dissolving the conjugated organic semiconductor polymer and the thermoplastic resin or the uncured thermosetting resin into a solvent to obtain an organic NTC composition solution;
applying the organic NTC composition solution to the electrodes formed on a substrate surface; and
drying it to remove the solvent so as to form an organic NTC composition layer over the electrodes.

(8) A method of producing the organic NTC device defined in (5) or (6), comprising the steps of:
dissolving the conjugated organic semiconductor polymer and the thermoplastic resin or the uncured thermosetting resin into a solvent to obtain an organic NTC composition solution;
applying the organic NTC composition solution to one metal foil surface that forms the electrode;
drying it to remove the solvent so as to form an organic NTC composition layer on the metal foil surface; and
applying another metal foil that forms the electrode to the organic NTC composition layer.

(9) A method of producing the organic NTC device defined in (5) or (6), comprising the steps of:
dissolving the conjugated organic semiconductor polymer and the thermoplastic resin or the uncured thermosetting resin into a solvent to obtain an organic NTC composition solution;
removing the solvent while stirring the organic NTC composition solution;
plasticizing the mixture composition after the removal into a mold of a predetermined shape; and
sandwiching the mold between the paired electrodes.

BEST MODE FOR CARRYING OUT THE INVENTION

Figure 1:
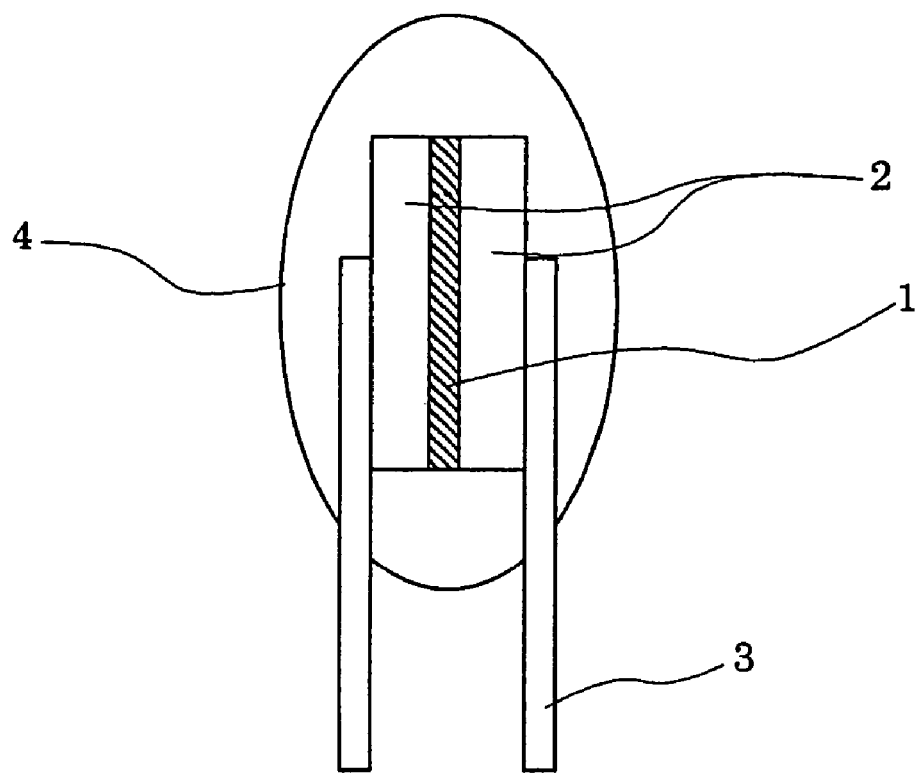
FIG. 1 is a schematic sectional view showing an organic NTC device according to the present invention.

The embodiment of the present invention will be described in detail with reference to the drawings.

To begin with, an organic NTC composition according to the present invention is a mixture of a conjugated organic semiconductor polymer and a thermoplastic resin or thermosetting resin. In particular, as will be described, in view of production and performance of the organic NTC device of the present invention, the mixed amount of the thermoplastic resin or thermosetting resin is preferably equal to or lower than two times the amount of the conjugated organic semiconductor polymer, and the conjugated organic semiconductor polymer is particularly preferable if it is selected from solvent-soluble polyaniline, polythiophene, polypyrrole and their derivatives.

Specifically, the conjugated organic semiconductor polymer in the aforementioned organic NTC composition, is generally selected from the conjugated organic polymers having specific resistance ranging from $1 \times 10^{-3}$ to $1 \times 10^7$ Ω·cm, i.e., falling in the semiconducting region. Specific examples of such conjugated organic semiconductor polymers include polyacetylene, polyparaphenylene, polypyrrole, polythiophene, polyaniline, polyphenylene vinylene, polyselenophene, polyazulene, polypyrene, polycarbazole, polypyridazine, polynaphthylene, polyfluorene and the like.

Among these, solvent-soluble types are preferred. Because this property makes it easy for the polymer to be blended with an aftermentioned thermoplastic resin or thermosetting resin, hence makes it possible to provide a more stable composition than that obtained from its slurry dispersion.

In order to provide solvent-solubleness, it is preferred that substituents such as alkyl groups, alkoxyl groups and the like are introduced. Preferred examples include derivatives of conjugated organic semiconductor polymers such as polyethylene dioxithiophene, polythienylene vinylene, poly(3-methyl thiophene), poly(3,4-dimethylthiophene), poly(3-methoxythiophene), poly(3-ethoxythiophene), poly(3-thiophene-β-ethanesulfonyl), polymethylpyrrole, poly(3-hexylpyrrole), poly(methyl 3-methyl-4-pyrrolecarboxylate), poly(ethyl 3-methyl-4-pyrrolecarboxylate), poly(3-methylaniline), poly(3-phenylaniline), poly-cyano-phenylene vinylene, poly-dimethoxy-phenylene vinylene, etc.

Among these conjugated organic semiconductor polymers, derivatives of polypyrrole, polythiophene, or polyaniline, which present a high enough solvent-solubility and high stability with respect to temperature and humidity, are particularly preferred.

Such introduction of substituents electronically affects π-electrons, causing the derivatives to present a higher specific resistance than that of the original conjugated organic semiconductor polymers. Further, because of the molecular structure, the distance between adjacent conjugate components along the principal chain is made longer appropriately, so an appropriate semiconducting region can be easily obtained, making it possible to provide a sufficient NTC function.

The conjugated organic semiconductor polymers can be obtained from monomers as structural units, by use of oxidative polymerization catalysts, including: chlorides of transition metals such as ferric chloride, cupric chloride, stannic chloride, etc.; peroxides such as hydrogen peroxide, ozone, dibenzoyl peroxide, etc.; metal oxides such as silver oxide, etc.; inorganic acids such as permanganic acid, chromic acid, hypochlorous acid, etc. and their salts; perchlorates such as ferric perchlorate, cupric perchlorate, etc.; and persulfides such as ammonium persulfide, sodium persulfide, potassium persulfide, etc.

For resistance adjustment purpose, or for adjustment of the thermistor constant as described hereinbelow, an acceptor-type or donor-type dopant (impurity which is added in a very small amount to a conductive polymer or the like for alternating the fixed electric characteristic, whereby the resistance can be efficiently reduced) can be doped into the conjugated organic semiconductor polymer. As the acceptor, a halogen such as iodine, bromine, etc., Lewis acids such as $PF_5$, $AsF_5$, $BF_3$, etc., proton acids such as HF, HCl, $H_2SO_4$ etc., organic acids such as p-toluene sulfonic acid, etc., transition metal compounds such as $FeCl_3$, $TiCl_4$, etc., organic materials such as tetracyanoquinodimethane, tetracyano-tetraazanaphthalene, chloranil, etc., can be doped. As the donor, alkali metals such as Li, Na, K, etc., alkaline earth metals such as Ca, Sr, Ba, etc., can be doped. There occurs a case where addition of these dopants makes the electron state of the conjugated organic semiconductor polymer close to that of conductors, depriving semiconductive property, hence, the NTC function, i.e., the resistance reduction ratio with respect to temperature, may decrease. In other words, since the thermistor constant may decrease, the dopants should be compounded correctly but not excessively.

Among the oxidative polymerization catalysts for the conjugated organic semiconductor polymer, halogens, transition metal chlorides and the like may function as a dopant; this can be removed or made ineffective by ion exchange or other methods, if required.

Further, since the resistance may change with passage of time due to dedoping, electrolyte anions and electrolyte cations are preferably not used, but those of polymer types that have substituents with a doping function are preferably used.

Particularly, it is convenient and preferable that dopants are introduced into dendrimers, which are synthesized from central core molecules with AB2 type monomers as the starting material, oligomers, polymers such as polystyrene, polymethylmethacrylate, etc., or fullerene molecules, and are carried thereby as functional groups.

In this way, the dopants which are supported by core carriers and present multiple functions, can create bridges between conjugated organic semiconductor polymers, and further creates pseudo-IPN (interpenetrating polymer network) with the mixed thermoplastic resin or thermosetting resin, whereby it is possible to inhibit the conjugated organic semiconductor polymer and the resin from separating from each other, lending itself to effective stabilization.

Other than above, a self-doped form in which dopants are polymerized with conjugated organic semiconductor polymers constitutes an effective method for fixing dopants.

If a semiconductor is pure, the NTC function will not appear because all the electrons are essentially confined within the orbits of the atoms hence cannot move freely between atoms. However, if some impurity is added to a semiconductor so as to produce electrons deviated from the atomic orbits, those electrons become able to move. As the temperature is increased, electrons are thrown up out of the peripheral orbit, and free electrons increase in number. This results in lowering of the semiconductor resistance.

When a conjugated organic semiconductor polymer is mixed with an aftermentioned insulative polymer, regardless of whether the conjugated organic semiconductor polymer is dispersed in molecular level within the insulative polymer, i.e., is blended in a compatible manner, or clusters of the conjugated organic semiconductor polymer are dispersed therein, the mixture has semiconduction and presents an NTC function as long as the polymer is semiconductive.

The resin to be mixed with the conjugated organic semiconductor polymer may be a thermoplastic or thermosetting one. Since the resin has to be dissolved in a solution that dissolves the conjugated organic semiconductor polymer, resins presenting a relatively high polarity are preferred.

Examples of the thermoplastic resin include polyamide, polyester, polyurethane, polyamide-imide, polyetherimide, polyimide, polyethersulfone, polysulfone, polyphenylene sulfide, polyacrylamide, polyacryl, polyphenoxy, polybutyral, polyethylene glycol and the like.

Examples of the thermosetting resin include epoxy resin, urethane resin, urea resin, maleimide resin, nitrile rubber and the like.

Also, mixtures, copolymers, modified materials or the like of the above resins can be used appropriately.

Further, additive agents, usually used in resin compounds, such as stabilizers, plasticizers, antioxidants, UV absorbers, photostabilizers, internal release agents, processing aids, dispersants, compatibilizers, flame retarders, adhesion accelerators and others can be added up to an amount so as not to spoil the mechanical and electrical properties of the device.

Of the above, the thermosetting resin is preferred because it forms a high degree of crosslinking, is of low expansion, and provides a high bonding strength to the electrodes. Particularly, epoxy resin, urethane resin and urea resin are excellent in compatibility, hence preferable.

The blended ratio (by weight) of the thermoplastic resin or thermosetting resin is not greater than two times the amount of the conjugated organic semiconductor polymer, preferably, equal to or lower than the amount thereof, more preferably, 0.1 times or greater and 0.5 times or lower.

If the mixed amount exceeds two times, the semiconducting property of the organic NTC composition is liable to spoil. Also, though it depends on the distance between the paired electrodes and the contact areas of the composition with the electrodes, the device may present 1 MΩ or higher resistance. Further, even though, in the mixing process individual components to be blended in the organic NTC composition have been dissolved compatibly, there are cases where the conjugated organic semiconductor polymer and the thermoplastic resin or the like may separate from each other with the process of solvent's evaporation, forming islands. This will cause the composition to be unstable in electrical characteristic and be unable to show conduction in the worst case. To deal with this, a compatibilizer and the like can be used.

Further, some components of curing agents of the thermosetting resin may disturb the aforementioned doping effect. It is therefore necessary to be cautious about obtaining the necessary initial resistance and thermistor characteristics.

When no thermoplastic resin or thermosetting resin is included, the aftermentioned thermistor constant (reduction of resistance depending on variation in temperature) becomes greater but the adhesion to the electrodes may lower or the workability may spoil. To deal with this, it is preferred that the characteristic of the thermistor constant of the conjugated organic semiconductor polymer should be evaluated.

The thermistor constant (B) is represented by Eq. 1:

$$B=Ln(RH/RL)/(1/TL-1/TH), \quad \text{Eq. 1}$$

where RL is the resistance value at a low temperature (TL: absolute temperature) and RH the resistance value at a high temperature (TH: absolute temperature).

Adjustment of the thermistor constant is made predominantly depending on the type of the conjugated organic semiconductor polymer and the aforementioned doping method. The resistance value of the organic NTC composition can be adjusted principally by the contact areas of the electrodes and their distance, the mixed amount of the thermosetting resin or the like.

For Eq. 1, a plot of the natural logarithm of the resistance on the vertical axis versus the temperature on the horizontal axis will produce a declining straight line towards the right, and from that it is possible to evaluate the characteristics of the semiconductor having an NTC function. If the conjugated organic semiconductor polymer is conductive, the plot presents an approximately horizontal line similar to the case of a conductive member with a conductive filler filled therein, so that it is possible to easily determine the semiconducting performance. The NTC device using the composition of the present invention, usually has a thermistor constant of 1000 to 20,000 (deg K). In order to obtain a high-sensitivity device, this value should be set to be large.

Next, the organic NTC device according to the present invention will be detailed.

The organic NTC device according to the present invention is made up of the aforementioned organic NTC composition provided between a pair of electrodes.

For example, a pair of comb-toothed electrodes (see electrodes 2 in FIG. 2) provided on an insulative substrate, such as a glass plate, polyimide film, glass-epoxy substrates or the like, can be formed by an ordinary patterning method using a conductive paste of gold, silver, palladium or the like, ITO film, chromium film, copper foil, gold-plated nickel foil or the like. In the present invention it is preferred that the inter-line distance on the pattern is set within about 0.1 mm to 0.5 mm and the gross length of electrodes is set to be 100 to 1000 mm.

Figure 2:
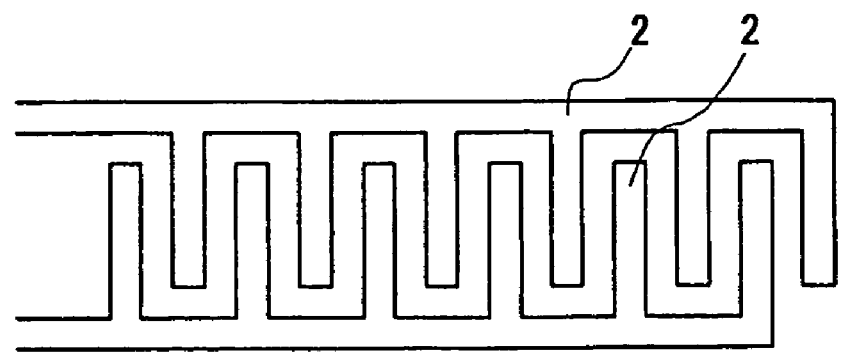
FIG. 2 is a plan view showing comb-like electrodes formed on the surface of a substrate used for an organic NTC device according to the present invention.

In the organic NTC device according to the present invention, an organic NTC composition layer is formed on the pattern shown FIG. 2 by applying or printing a solution of the organic NTC composition over the pattern and drying it.

Further, the organic NTC device according to the present invention can be characterized by formation of the electrodes with metal foil. In this case, the surface of the electrodes in contact with the organic NTC composition is preferably roughened.

For example, when the paired electrodes are comprised of two pieces of opposing metal foil, the organic NTC device according to the present invention can take the configuration shown in FIG. 1. Organic NTC composition 1 is provided between two sheets of metal foil 2 with a lead 3 joined on the outer side of each sheet of metal foil. Organic NTC composition 1 and metal foil 2 are overall covered by a protective layer with part of leads 3 sticking out from the protective layer.

For the metal foil, single metal foil formed of copper, iron, nickel, brass, aluminum or the like, composite foil, alloy foil, etc., can be used. It is preferred that the surface of the metal foil in contact with the organic NTC composition is roughened. For example, the surface is preferably roughed by electrodeposition or by thermal spraying so that the center line average height Ra is 0.1 µm or greater. This surface roughening improves the durability of the device product itself and also prevents minute peeling failure of the organic NTC composition even though cooling and heating cycles from a temperature of −40 deg. C. to 125 deg. C. are repeated. With no surface roughening treatment, minute peeling failure would occur due to repeated cycles of cooling and heating, resulting in poor resistance value repeatability at the same temperature.

Next, the production process of an organic NTC device according to the present invention will be described.

The production process of an organic NTC device according to the present invention is for the production of the aforementioned organic NTC device. The production process of the organic NTC device according to the present invention includes the step of dissolving first the conjugated organic semiconductor polymer and a thermoplastic resin or uncured thermosetting resin into a solvent to obtain an organic NTC composition solution. The organic NTC composition solution may be added with other additives etc., if necessary. To deal with the use of a thermosetting resin, a two-component liquid system, i.e., the use of a separated curing agent or catalytic component, can be employed in consideration of the relationship to the pot life.

As the solution for the common solvent, dimethyl formamide, dimethyl acetamide, n-methyl pyrrolidone, THF and the like can be considered. In the present invention, however, the solvent should not be limited to these.

The production method of an organic NTC device according to the present invention is characterized in that the organic NTC composition solution is applied over the electrodes formed on the surface of a substrate and is dried so as to remove the solvent, whereby the organic NTC composition layer is formed on the electrodes.

For example, the organic NTC composition solution is applied by screen printing, by ink-jet printing or by other methods, with a thickness of 1 to 50 µm over comb-toothed electrodes 2, 2, formed opposing each other on an insulative substrate as shown in FIG. 2. After drying sufficiently, a protective layer is formed with epoxy potting mold, a metal cap or others to complete an organic NTC device.

The production method of an organic NTC device according to the present invention is characterized in that the organic NTC composition solution is applied over a first metal foil surface constituting an electrode and is dried so as to remove the solvent, whereby the organic NTC composition layer is formed on the metal foil surface, and a second metal foil is applied on the organic NTC composition layer.

For example, the organic NTC composition solution is coated on the first metal foil (electrode) and dried sufficiently, the second metal foil (electrode) is applied by heat rolling, and a thermosetting resin is cross-linked as required. Then, the lamination is punched out into a desired shape. A lead is joined to each electrode as required, and the cutout is dip molded with epoxy resin to thereby complete an organic NTC device (see FIG. 1).

Further, the production method of an organic NTC device according to the present invention comprises the steps of: removing the solvent while stirring the organic NTC composition solution; plasticizing the mixture composition into a mold of a predetermined shape; and sandwiching the mold between the paired electrodes.

For example, the organic NTC composition solution is dried by a vacuum mixing dryer so that the solvent is fully evaporated, then the resultant compound is plasticized by heating to form a mold. Concerning the molding method, the device can be also formed by extrusion molding, heat laminate process, injection molding, transfer molding, or the like.

The thus configured organic NTC device can be produced at a low temperature without use of expensive rare earth transition elements. It is also possible to easily adjust the thermistor constant of the organic NTC composition by selecting the type of the conjugated organic semiconductor polymer or by changing the doping method. The resistance value of the organic NTC device can also be adjusted easily. Therefore, it can present the same performance as a ceramic NTC device does. In this way, since the organic NTC device provides high productivity and working flexibility, an organic NTC device, like a printed resistor, can be provided in a desired shape by printing the organic NTC composition solution on a circuit board with other electronic parts formed thereon, to thereby produce a hybrid circuit board or the like, for example.

Next, examples of the present invention will be described in a more detailed manner. However, the present invention should not be limited to the examples hereinbelow.

Example 1

As the conjugated organic semiconductor polymer, 100 g poly(butyl 3-methyl-4-pyrrolecarboxylate) and 10 g tetracyanoquinodimethane, 25 g polyamide resin (a product of TOYOBO Co., Ltd.) were dissolved and blended in 200 g dimethyl acetamide, to obtain a brown transparent organic NTC composition solution. This solution was screen printed on a pattern of electrodes which was formed by etching copper foil (35 μm) on a polyimide film, with an inter-electrode distance of 0.15 mm and a gross inter-line length of 300 mm, and was dried to form an NTC composition having a film thickness of 20 μm. Then, this, except its leads, was epoxy dipped to create a protective layer, to complete an organic NTC device.

The initial resistance was measured at 0 deg. C. and at 100 deg. C. The thermistor constant was measured. Further, 100 cycles of cooling and heating from 0 deg. C. to 100 deg. C. (the temperature increasing and degreasing rates were 1 deg. C./minute) were repeated, and the variational ratio from the initial resistance was measured. Also, total evaluation including productivity, manufacturing flexibility, price and the like was made. The result is shown in Table 1 below, where ⊚ represents "more excellent", ○ "excellent", Δ "ordinary" and × "bad".

Example 2

As the conjugated organic semiconductor polymer, 100 g poly(methyl 3-methyl-4-pyrrole carboxylate) and 10 g tetracyano-tetraazanaphthalene, 10 g epoxy resin (EPIKOTE 1001, a product of Yuka-Shell Epoxy Co., Ltd.) and 10 g polyamide curing agent (EH-335, a product of Asahi Denka Co., Ltd.) were dissolved and blended in a 100 g mixed solvent of dimethyl formamide and toluene (DMF:toluene=9:1) to obtain a brown opaque organic NTC composition solution. This solution was sheeted over electrolyte nickel foil (having a thickness of 25 μm and a centerline average height of 1.6 μm) by heat roll to form an NTC composition having a film thickness of 145 μm. Subsequently, the same metal foil was applied by heat roll. The thus sandwiched NTC composition was punched out into a circular form of 15 mm in diameter. Nickel silver foil strips were joined by resistance welding to form leads. Thereafter, the same treatment as in Example 1 was effected.

Example 3

As the conjugated organic semiconductor polymer, 100 g poly(3-phenylaniline) and 30 g epoxy resin (EPIKOTE 828, a product of Yuka-Shell Epoxy Co., Ltd.), 5 g para-toluen sulfonic acid and 10 g triphenyl phosphate (a product of Daihachi Chemical Industry Co., Ltd.) were dissolved and blended in a 100 g mixed solvent of dimethyl formamide and toluene (DMF:toluene=9:1) to obtain a brown opaque organic NTC composition solution. This solution was sheeted over electrolyte nickel foil (having a thickness of 25 μm and a centerline average height of 1.6 μm) by heat roll to form an NTC composition having a film thickness of 125 μm. Subsequently, the same metal foil was applied by heat roll. The thus sandwiched NTC composition was punched out into a circular form of 15 mm in diameter. Nickel silver foil strips were joined by resistance welding to form leads. Thereafter, the same treatment as in Example 1 was effected.

Example 4

As the conjugated organic semiconductor polymer, 100 g polyethylene dioxithiophene (a product of Agfa-Gevaert Japan), 40 g sulfonated polystyrene and 78 g acrylonitrile copolymer (molar ratio of acrylonitrile and butyl methacrylate=2:1) were dissolved and blended in a 1500 g dimethyl formamide solvent to obtain a blue transparent organic NTC composition solution. This solution was spin coated on a pattern of electrodes which was formed by etching chromium vapor deposition film (3000 angstrom) on glass, with an inter-electrode distance of 0.05 mm and a gross inter-line length of 200 mm, and was dried to form an NTC composition having a film thickness of 1 μm. After removal of the masking of the chromium electrodes on the glass, it was cut out into 4×6 mm$^2$ pieces. Silver paste was applied to the chromium electrodes at the end while the other part was formed with a protective layer to complete an organic NTC device. Thereafter, the same treatment as in Example 1 was effected.

For each example, the initial resistance (Ω), thermistor constant (deg. K) and variational ratio (%) after cycles of cooling and heating are shown in Table 1.

TABLE 1

| Evaluation | | Ex. 1 | Ex. 2 | Ex. 3 | Ex. 4 |
|---|---|---|---|---|---|
| Initial Resistance (Ω) | Temp. 0 deg. C. | 3300 | 250 | 65000 | 70500 |
| | Temp. 100 deg. C. | 280 | 12 | 6000 | 310 |
| Thermistor Constant (deg. K) | | 2510 | 3090 | 2430 | 5530 |
| Variational Ratio (%) after cooling and heating cycles | | 4 | 2 | 8 | 1 |
| Total Evaluation | | ⊚ | ⊚ | ⊚ | ⊚ |

INDUSTRIAL APPLICABILITY

As described heretofore, the composition of the present invention consists of a conjugated organic semiconductor polymer and a thermoplastic resin or thermosetting resin. In particular, by specifying the mixed amount of the thermoplastic resin or thermosetting resin to be equal to or lower than two times the amount of the organic semiconductor polymer, it is possible to provide an organic NTC composition which can be used to manufacture organic NTC devices at low temperatures without any need of expensive materials, hence is highly useful in industry. Further, this composition permits high productivity and flexibility in manufacturing. Thus, the organic NTC device and the producing method thereof are highly applicable in the industrial fields.

The invention claimed is:

1. An organic Negative Temperature Coefficient (NTC) composition comprising a mixture of:
   A) a conjugated organic semiconductor polymer; and
   B) a thermoplastic resin or thermosetting resin.

2. The organic NTC composition according to claim 1, wherein the amount of the thermoplastic resin or thermosetting resin is no more than twice the amount of the conjugated organic semiconductor polymer.

3. The organic NTC composition according to claim 1, wherein the conjugated organic semiconductor polymer is selected from the group consisting of polyaniline, polythiophene, polypyrrole and their derivative polymers.

4. The organic NTC composition according to claim 3, wherein the conjugated organic semiconductor polymer is solvent-soluble.

5. An organic NTC device comprising:
   A) a pair of electrodes, and
   B) the organic NTC composition of claim 1 disposed therebetween.

6. The organic NTC device according to claim 5, wherein the electrodes are of metal foil and have roughened surfaces in contact with the organic NTC composition.

7. A method of producing the organic NTC device according to claim 5, comprising:
   A) dissolving a conjugated organic semiconductor polymer with a thermoplastic resin or an uncured thermosetting resin in a solvent;
   B) applying the resulting solution to the electrodes on a substrate surface; and
   C) drying the solution on the substrate to remove the solvent and form an organic NTC composition layer on the electrodes.

8. A method of producing the organic NTC device according to claim 5, comprising:
   A) dissolving a conjugated organic semiconductor polymer with a thermoplastic resin or the uncured thermosetting resin in a solvent to obtain an organic NTC composition solution;
   B) applying the resulting solution to a first metal foil surface defining a first electrode;
   C) drying the solution on the first metal foil surface to form an organic NTC composition layer on the first metal foil surface; and
   D) applying a second metal foil defining a second electrode to the organic NTC composition layer.

9. A method of producing the organic NTC device of claim 5 comprising:
   A) dissolving a conjugated organic semiconductor polymer with a thermoplastic resin or an uncured thermosetting resin in a solvent;
   B) removing the solvent from the resulting solution while stirring;
   C) plasticizing the resulting product into a mold of a predetermined shape; and
   D) sandwiching the mold of the predetermined shape between the pair of electrodes.

10. The organic NTC composition according to claim 3, wherein the conjugated organic semiconductor polymer and the thermoplastic resin or thermosetting resin are soluble in a common solvent.

* * * * *